(12) United States Patent
Chan

(10) Patent No.: US 8,150,341 B2
(45) Date of Patent: Apr. 3, 2012

(54) APPARATUS FOR TRANSMITTING A SIGNAL BELOW A STANDARD TRANSMIT POWER IN A NETWORK

(75) Inventor: Kevin T. Chan, Pasadena, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/099,031

(22) Filed: May 2, 2011

(65) Prior Publication Data

US 2011/0207421 A1 Aug. 25, 2011

Related U.S. Application Data

(63) Continuation of application No. 12/620,215, filed on Nov. 17, 2009, now Pat. No. 7,957,711, which is a continuation of application No. 11/220,623, filed on Sep. 8, 2005, now Pat. No. 7,643,804.

(60) Provisional application No. 60/608,146, filed on Sep. 9, 2004.

(51) Int. Cl.
*H04B 1/04* (2006.01)
*H01Q 11/12* (2006.01)

(52) U.S. Cl. .............. 455/127.1; 455/522; 455/115.1; 455/126

(58) Field of Classification Search ............ 455/127.1, 455/522, 115.1, 126, 69, 127.2, 67.11, 13.4; 330/129, 279
See application file for complete search history.

(56) References Cited

U.S. PATENT DOCUMENTS

| | | | | |
|---|---|---|---|---|
| 5,737,407 A | * | 4/1998 | Graumann | 379/388.04 |
| 5,774,797 A | * | 6/1998 | Kawano et al. | 455/127.2 |
| 6,483,865 B1 | * | 11/2002 | Beierle | 375/130 |
| 7,643,804 B2 | | 1/2010 | Chan | |
| 2010/0062734 A1 | | 3/2010 | Chan | |

* cited by examiner

*Primary Examiner* — John J Lee
(74) *Attorney, Agent, or Firm* — Sterne, Kessler, Goldstein & Fox P.L.L.C.

(57) ABSTRACT

A transmitter includes a detection element to determine when a current power requirement of a communication link is less than the standard transmit power. The current power requirement may be determined by a current operation condition of the communication link, for instance. The transmit power of the transmitter may be set to be less than the standard power in any of a variety of ways. For example, a center tap voltage of the transmitter may be reduced. In another example, a class of operation of the transmitter may be changed. In yet another example, the transmitter may include a current mirror having a plurality of diode-connected transistors coupled in parallel, thereby reducing the current at output terminals of the transmitter. Reducing the current at the output terminals decreases the output power of the transmitter, which may reduce the power consumed by the transmitter.

20 Claims, 7 Drawing Sheets

APPARATUS FOR TRANSMITTING A SIGNAL BELOW A STANDARD TRANSMIT POWER IN A NETWORK

CROSS-REFERENCE TO RELATED APPLICATION

This application is a continuation of patent application Ser. No. 12/620,215, filed Nov. 17, 2009, which is a continuation of patent application Ser. No. 11/220,623, filed Sep. 8, 2005, which claims priority to Provisional Application No. 60/608,146, filed Sep. 9, 2004, all of which are incorporated herein by reference in their entireties.

BACKGROUND OF THE INVENTION

1. Field of the Invention

The present invention relates generally to networks, and more specifically to setting transmitter power in a network.

2. Background

Devices in a network generally include transmitters to transmit information via an electrically conductive medium, such as a twisted wire pair, a coaxial cable, a fiber optic cable, etc. For instance, a transmitter in a first device can transmit information to a receiver in a second device, and a transmitter in the second device can transmit information to a receiver in the first device. Devices that are connected in a network are often referred to as link partners. The transmit and receive functions of a link partner are often combined using a transceiver.

Ethernet is a type of network having link partners that are often connected via twisted pair cable. Components, such as transmitters and receivers, in an Ethernet system may be configured to operate at any of a variety of speeds. The speed of transmission between link partners is often limited to the capability of the slower link partner. A component may be capable of operating at 10 megabits per second (Mbps) (referred to as 10 Base-T), 100 Mbps (referred to as 100 Base-T), and/or 1000 Mbps (referred to as 1000 Base-T), to provide some examples.

Conventional transmitters in a network transmit signals at a standard transmit power that is defined by a communication standard. For example, conventional Ethernet transmitters operate at a standard transmit power defined by a standard associated with Ethernet, regardless of the power requirements of an application. The power consumption of such conventional transmitters does not decrease for applications having a lower transmit power requirement.

What is needed, then, is an apparatus and method for reducing transmitter power for applications that do not require the standard defined level of transmit power.

BRIEF SUMMARY OF THE INVENTION

An apparatus and method for setting a transmit power at less than a standard transmit power is provided. A communication standard defines the standard transmit power. A transmitter includes a detection element to detect whether the current transmit power can be reduced below the standard transmit power. Detection by the detection element may be based on an operating condition of a communication link and/or the transmitter. The operating condition may be based on a length of a communication link, an attenuation characteristic of the communication link, an environmental condition of the communication link, or a speed of transmission associated with the communication standard, to provide some examples. The detection element may detect that the standard transmit power is unnecessary based on a 1000 base-T protocol, for example.

If the standard transmit power is unnecessary, any of a variety of means may be used to set a transmitter power of the transmitter to be less than the standard transmit power. According to a first embodiment, a center tap voltage of the transmitter is reduced. In a second embodiment, a class of operation of the transmitter is changed. According to a third embodiment, the transmitter includes a current mirror having a plurality of diode-connected transistors coupled in parallel, thereby reducing the current at output terminals of the transmitter. Reducing the current reduces the output power of the transmitter, which may reduce the power consumed by the transmitter. Setting the transmit power may reduce the current drawn by the transmitter. The transmitter value may be set at any value less than the standard transmit power. For example, the transmit power may be set at 20%, 50%, or any other percentage of the standard transmit power. The transmit power may be successively reduced, based on a series of detections performed by the detection element.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the pertinent art(s) to make and use the invention.

In the drawings, like reference numbers indicate identical or functionally similar elements. Additionally, the leftmost digit(s) of a reference number identifies the drawing in which the reference number first appears.

DETAILED DESCRIPTION OF THE INVENTION

Figure 1:
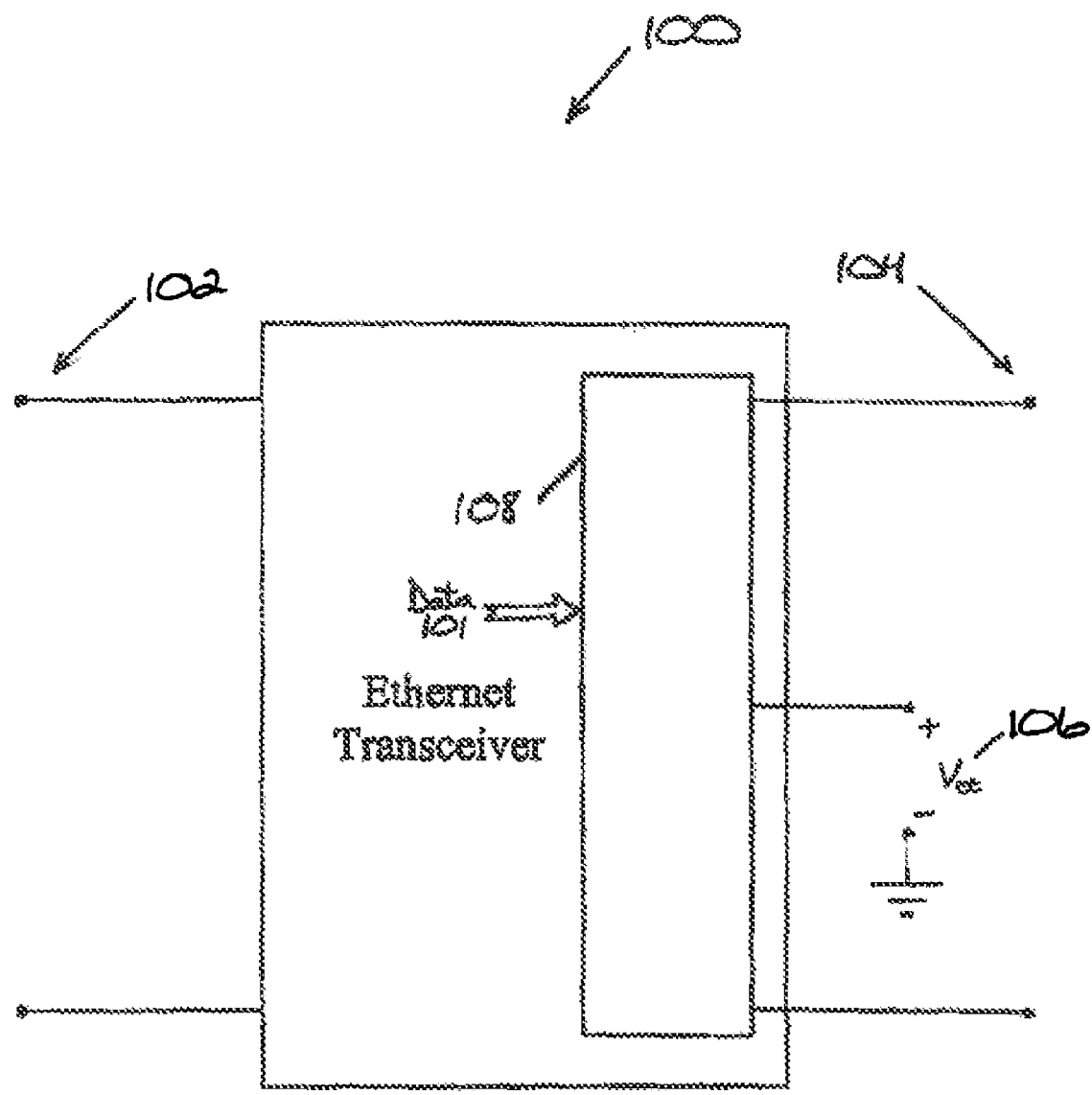
FIG. 1 illustrates an Ethernet transceiver according to embodiments of the present invention.

Although the embodiments of the invention described herein refer specifically, and by way of example, to Ethernet systems, including Ethernet transmitters, it will be readily apparent to persons skilled in the relevant art(s) that the invention is equally applicable to other networks and systems, including but not limited to serializer/deserializer (SerDes) systems, optical systems, cable systems, digital subscriber line (DSL) systems, and/or any combination thereof. An Ethernet transmitter can be an Ethernet transceiver, for example. It will also be readily apparent to persons skilled in the relevant art(s) that the invention is applicable to any network or system requiring a reduced transmitter power.

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to effect such feature, structure, or characteristic in connection with other embodiments whether or not explicitly described.

I. INTRODUCTION

Link partners in a network are connected via a link. The link may be any of a variety of transmission mediums, including but not limited to a twisted wire pair, a coaxial cable, a fiber optic cable, or any combination thereof. Link partners in an Ethernet system are often connected via twisted wire pairs. 10 Base-T and 100 Base-T Ethernet systems utilize two twisted wire pairs. The first pair is unidirectional transmit and the second pair is unidirectional receive. Thus, a transceiver in a 10 Base-T or 100 Base-T Ethernet system needs only one transmitter. 1000 Base-T, on the other hand, uses four twisted wire pairs, and each pair in a 1000 Base-T Ethernet system supports bidirectional transmit and receive signaling. Thus, a transceiver in a 1000 Base-T Ethernet system needs four transmitters. Consequently, 1000 Base-T transceivers have a higher power consumption than 10 Base-T or 100 Base-T transceivers.

At a standard transmit power, a 1000 Base-T transceiver having four Class A transmitters (including active hybrid) consumes 440 mW from a 2.5 V center tap voltage. At a standard transmit power, 10 Base-T and 100 Base-T Class A transceivers consume 250 mW and 100 mW, respectively, from a 2.5 V center tap voltage. A center tap voltage of 2.5 V is provided for illustrative purpose only. The center tap voltage may be any reasonable value.

The standard transmit power is not necessary for all applications. For example, a transmit power that is less than the standard transmit power may be sufficient for applications utilizing short cable lengths and/or low attenuation cable. Short cable lengths may be found in backplane applications, a conference room connection to a laptop computer, or a connection between an Internet phone and a laptop computer, to provide some examples.

II. TRANSMITTER POWER SETTING EMBODIMENTS

FIG. 1 illustrates an Ethernet transceiver 100 according to embodiments of the present invention. Ethernet transceiver 100 includes input terminals 102, output terminals 104, a center tap voltage 106, and transmitter 108. Ethernet transceiver 100 may be a link partner in an Ethernet network, receiving signals at input terminals 102 and transmitting signals at output terminals 104. Ethernet transceiver 100 may support 10-Base-T, 100-Base-T, 1000 Base-T, another Ethernet standard, a non-Ethernet communication standard, or any combination thereof.

In FIG. 1, transmitter 108 transmits an output signal at output terminals 104 based on data 101. The voltage of the output signal (i.e., the voltage across output terminals 104) may be based on center tap voltage 106. For example, varying center tap voltage 106 may vary the direct current (DC) component of the output voltage, which may be referred to as the "launch voltage" of transceiver 100. The output current is based on the configuration of transmitter 108.

Figure 2:
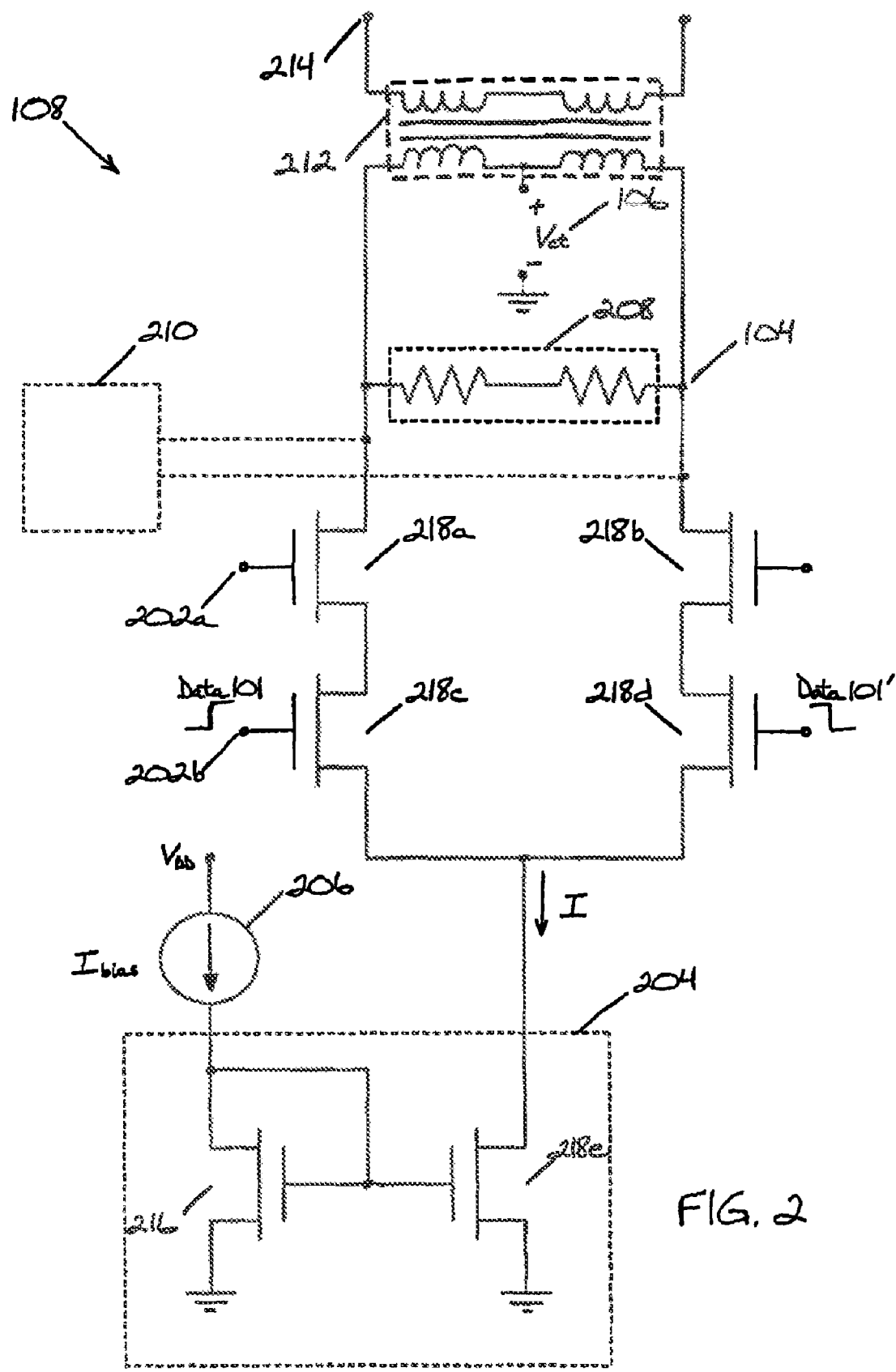
FIG. 2 is an example schematic representation of the transmitter of the Ethernet transceiver shown in FIG. 1 according to an embodiment of the present invention.

FIG. 2 is an example schematic representation of transmitter 108, shown in FIG. 1, according to an embodiment of the present invention. In FIG. 2, transmitter 108 includes first inputs 202a, second inputs 202b, a current mirror 204, a bias source 206, a resistor 208, an active hybrid 210, and differential output 104. A communication link 214, such as a twisted wire pair, is coupled to transmitter 108 via transformer 212. Transformer 212 provides a magnetic interface between transmitter 108 and communication link 214.

Referring to FIG. 2, bias source 206 biases current mirror 204, thereby setting the current I that flows through transistors 218a and 218c or through transistors 218b and 218d. Transistors 218c and 218d operate as a differential amplifier with a differential cascode load provided by transistors 218a and 218b, so as to modulate an output signal at differential output 104 with data 101. Transistors 218a and 218b are typically biased to saturation at first inputs 202a. The current I flows through transistors 218a and 218c when transistor 218c is turned on and transistor 218d is turned off by data 101. The current I flows through transistors 218b and 218d when transistor 218d is turned on and transistor 218c is turned off by data 101. The current I flows across resistor 208 to provide the output voltage across differential output terminals 104.

Data 101 may be used to turn on/off transistors 218c and 218d, thereby modulating the current I. As shown in FIG. 2, data 101 is provided to a gate of transistor 218c. Data 101 may be inverted to provide data 101'. In FIG. 2, data 101' is provided to a gate of transistor 218d. Thus, transistor 218c is turned on when transistor 218d is turned off, and vice versa. Switching on transistor 218c causes the current I to flow across differential output terminals 104 in a first direction. Switching on transistor 218d causes the current I to flow across differential output terminals 104 in a second direction that is opposite the first direction.

Transmitter 108 may be biased to operate in any class (e.g., Class A, Class B, or Class AB). For example, transmitter 108 may be biased to operate in Class A by alternately turning on transistors 218c and 218d, thereby splitting the current I substantially equally across transistor 218a and transistor 218b. Biasing transmitter 108 in this manner provides an output differential voltage of approximately 0 V. In another example, transmitter may be biased to operate in Class B by turning off both of transistors 218a-b, thereby providing an output differential voltage of approximately 0 V. The example biasing schemes described above are provided for illustrative purposes and are not intended to limit the scope of the present invention. Class A, B, or AB operation may be achieved in any of a variety of ways and using any of a variety of biasing schemes. The output differential voltage need not necessarily be approximately 0 V. Transmitter 108 may be biased to have any reasonable output differential voltage.

Active hybrid 210 distinguishes the output signal from an input signal received by transmitter 108 and inhibits the output from influencing the receiver input (not shown). Transmitter 108 need not necessarily include active hybrid 210.

In FIG. 2, current mirror 204 includes a transistor 218e and a diode-connected transistor 216, each of which has a gate, a drain, and a source. The gate and the drain of diode-connected transistor 216 are connected together. The gates of transistor 218e and diode-connected transistor 216 are connected together. The sources of transistor 218e and diode-connected transistor 216 are coupled to a ground potential, though the scope of the present invention is not limited in this respect. The sources of transistor 218e and diode-connected transistor 216 may be coupled to any voltage potential.

Bias source 206 provides a bias to diode-connected transistor 216 of current mirror 204. In FIG. 2, the bias provided by bias source 206 is a current. The current flowing through diode-connected transistor 216 is "mirrored" at transistor 218e. In other words, the current $I_{bias}$ flowing through diode-connected transistor 216 and the current I flowing through transistor 218e are the same, assuming that transistor 218e and diode-connected transistor 216 are the same size. Based on this assumption, $I=I_{bias}$. However, transistor 218e and diode-connected transistor 216 need not necessarily be the same size. For example, if transistor 218e is larger than diode-connected transistor 216, then $I>I_{bias}$, though the current I increases/decreases as the current $I_{bias}$ increases/decreases. In another example, if transistor 218e is smaller than diode-connected transistor 216, then $I<I_{bias}$, though the current I increases/decreases as the current $I_{bias}$ increases/decreases.

The output voltage, which is measured across differential output terminals 104, is based on the resistance of resistor 208 and the current I. Resistor 208 may be referred to as a source termination. Resistor 208 may be on-chip, meaning that resistor 208 is included in an integrated circuit (IC) die that includes transmitter 108. Alternatively, resistor 208 may be off-chip, meaning that resistor 208 is external to an IC die that includes transmitter 108. In an off-chip configuration, resistor 208 may be coupled to the IC die using solder and/or bond wires.

The resistance of resistor 208 and the resistance of a load, such as communication link 214, can be approximately the same. For instance, resistor 208 and the load can each have a resistance of 50Ω or 100Ω, to provide some examples. Resistor 208 and the load can have any suitable resistance, and the resistance of each need not necessarily be the same.

Resistor 208 need not necessarily be a differential resistor, as shown in FIG. 2. In an embodiment, resistor 208 is two single-ended resistors. The first single-ended resistor is coupled between a drain of transistor 218a and a node. The second single-ended resistor is coupled between a drain of transistor 218b and the node. The node may be connected to a supply voltage, for example.

A communication standard, such as 1000 base-T, may define a standard transmit power for output signals at output terminals 104. However, not all applications require transmission at the standard transmit power for proper operation.

Figure 3:
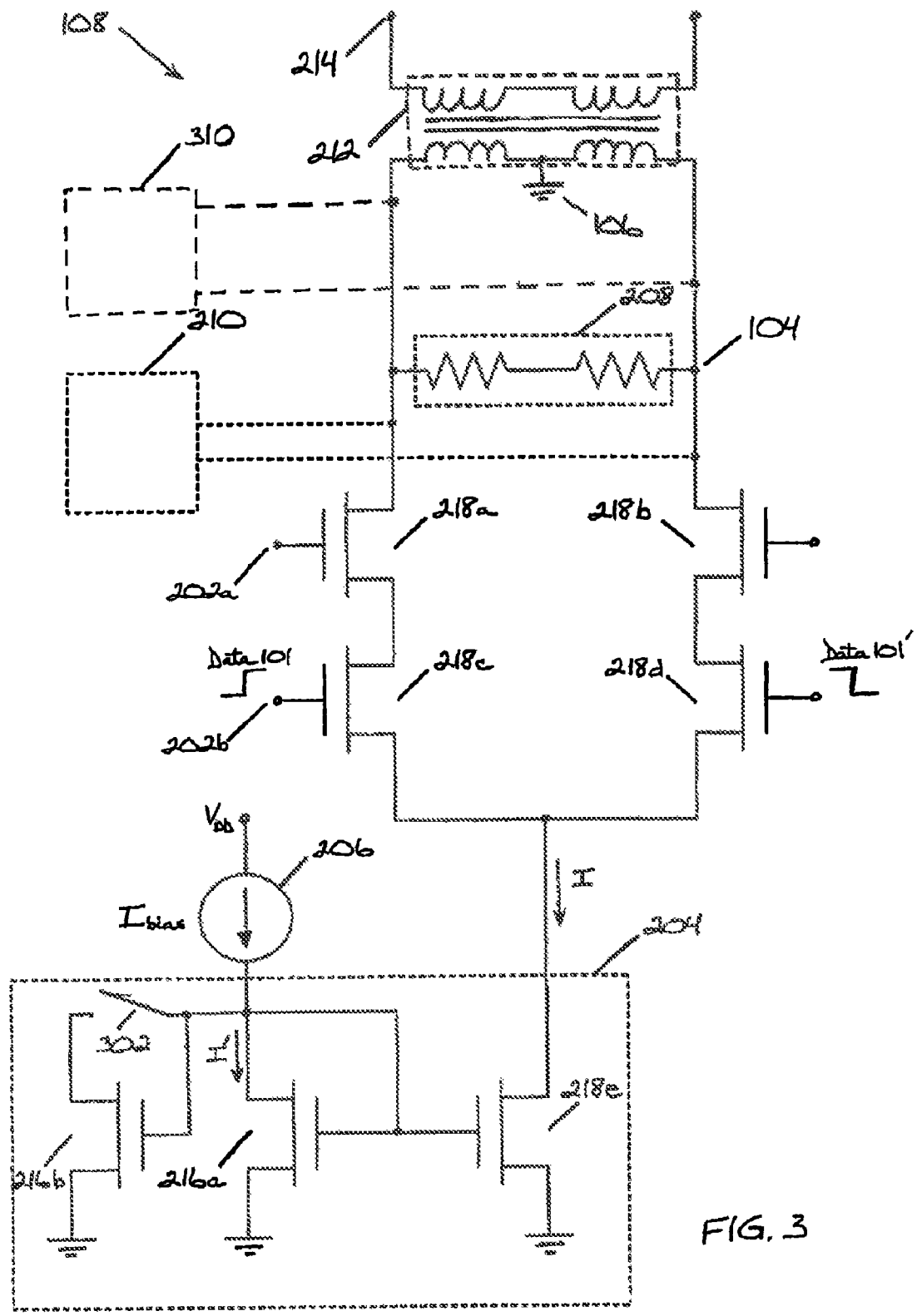
FIG. 3 shows the transmitter of FIG. 2 having diode-connected transistors that are capable of being connected in parallel according to an embodiment of the present invention.

FIG. 3 shows that transmitter 108 may include a detection element 310 to determine when a current power requirement is less than the standard transmit power. The current power requirement may be determined by a current operation condition of communication link 214. Example operating conditions for which the current power requirement may be less than the standard transmit power include but are not limited to a relatively short cable length, a relatively low attenuation characteristic, an environmental condition, or transmission speed.

A short cable length may be used in any of a variety of applications, such as a laptop connected to a hub in an office or a conference room, an Internet protocol (IP) telephone connected to a laptop computer, a board connected to a backplane/chassis of a network, etc. A short cable length may be defined as a length that is less than a threshold. The threshold is determined based on the ability of transmitter 108 to transmit a signal having sufficient power for a receiver to properly receive the signal. The threshold may be 1 ft, 1 m, 5 ft, 50 m, 100 m, or any other length. The transmission power of transmitter 108 may be set less than a standard transmit power in response to detection element 310 detecting a cable length that does not exceed the threshold.

An attenuation characteristic is defined as an amount of attenuation per unit of length of communication link 214. For instance, communication link 214 may have an attenuation characteristic of 1 dB/m, 0.05 dB/ft, etc. A low attenuation cable may be defined as cable having an attenuation characteristic that is less than a threshold. The low attenuation cable may be specified as cable of a particular type, though the scope of the present invention is not limited in this respect. For example, the low attenuation cable may be specified to be category 6 cable, category 7 cable, optical cable, etc. The transmission power of transmitter 108 may be set less than a standard transmit power in response to detection element 310 detecting an attenuation characteristic that does not exceed the threshold.

An environmental condition may provide a relatively low signal-to-noise ratio (SNR), for example. In this example, the transmission power of transmitter 108 may be set less than a standard transmit power in response to detection element 310 detecting a SNR that does not exceed a predetermined threshold.

A speed of transmission may be defined by a communication standard, such as 10 base-T, 100 base-T, 1000 base-T, another Ethernet standard, or a non-Ethernet communication standard. The transmission power of transmitter 108 may be set less than a standard transmit power defined by the communication standard in response to detection element 310 detecting a transmission speed associated with the communication standard.

Because the power of transmitter 108 is based on the output voltage across differential output terminals 104 and the current I, the power of transmitter 108 may be reduced by reducing the output voltage and/or the current I.

According to a first embodiment, the power consumption of transmitter 108 is reduced by reducing center tap voltage 106 of transmitter 108. The output voltage (i.e., transmit voltage) of transmitter 108 is based on the launch voltage of transmitter 108. Center tap voltage 106 is set to accommodate the output voltage swing of transmitter 108. The power of transmitter 108 is based on the current I and center tap voltage 106. Thus, reducing the output voltage swing at terminals 104 of transmitter 108 may allow center tap voltage 106 to be reduced, thereby reducing the output power of transmitter 108. Reducing center tap voltage 106 from 2.5 V to 1.8 V, peak-to-peak, may reduce the power consumption of transmitter 108 by approximately 28%, for example. In FIG. 3, center tap voltage 106 is shown to be 0 V for illustrative purposes. Center tap voltage 106 may be set to any value.

In a second embodiment, the power consumption of transmitter 108 is reduced by changing the class of operation (e.g., Class A, B, or AB) of transmitter 108. For example, enabling Class AB mode may reduce the current drawn by transmitter 108, thereby further reducing the power consumption of transmitter 108, as compared to the first embodiment. Changing the bias of transmitter 108 from Class A or B mode to Class AB mode may reduce the power consumption of transmitter 108 by an additional 25-40%, for example, as compared to the first embodiment.

According to a third embodiment, the power consumption of transmitter 108 is reduced by connecting diode-connected transistors in parallel in current mirror 204. Current mirror 204 operates by providing a bias current $I_{bias}$ in a ratio of M:1 to differential output terminals 104, where M is the number of diode-connected transistors coupled in parallel in transmitter 108. Thus, the current I flowing through transistor 218e may be represented by the equation $I=I_{bias}/M$.

Second inputs 202b gate the current $I=I_{bias}/M$ across resistor 208. The output voltage of transmitter 108 is developed across resistor 208 and provided to communication link 214 via center tapped transformer 212. The output voltage is increased or decreased by adjusting the current mirror ratio of M:1 that feeds resistor 208. In this embodiment, adding or subtracting diode-connected transistor(s) 216 in the reference side of current mirror 204 adjusts the current I that flows through resistor 208.

In FIG. 3, transmitter 108 includes diode-connected transistors 216a-b that are capable of being connected in parallel according to an embodiment of the present invention. The drain of diode-connected transistor 216b is selectively connected to bias source 206, though the scope of the invention is not limited in this respect. For example, diode-connected transistors 216a-b may be permanently coupled in parallel, meaning that transistors 216a-b are "hard-wired" in parallel. In this example, transmitter 302 need not necessarily include switch 302.

Referring to FIG. 3, switch 302 is shown in an open state for illustrative purposes. When switch 302 is open, diode-connected transistor 216b is essentially an open-circuit. Thus, the current I' flowing through diode-connected transistor 216a is equal to the current provided by bias source 206 (i.e., $I'=I_{bias}$).

Switch 302 may be closed to connect the drain of diode-connected transistor 216b to bias source 206, thereby causing diode-connected transistors 216a-b to be coupled in parallel. When switch 302 is closed, the bias current $I_{bias}$ is divided substantially evenly between diode-connected transistors 216a-b, such that a current $I'=I_{bias}/2$ flows through each diode-connected transistor 216a-b. The current I' is mirrored at transistor 218e. Thus, the current flowing through transistor 218e when switch 302 is closed may be represented as $I=I'=I_{bias}/2$.

By closing switch 302, diode-connected transistor 216b is added to the reference side of current mirror 204, thereby reducing the current mirror ratio to 2:1 so that the load current I is one-half of $I_{bias}$. Reducing the load side current causes the output voltage across resistor 208 to be reduced proportionally. Connecting diode-connected transistors 216 in parallel reduces the power consumption of transmitter 108. Any number of diode-connected transistors 216a-n may be added in parallel.

Referring to FIG. 3, switch 302 need not necessarily be coupled between the drain of transistor 302 and bias source 206. For example, switch 302 may be coupled between the gate of transistor 216b and bias source 206 or between the source of transistor 216b and bias source 206.

Switch 302 may be controlled automatically or manually. For example, diode-connected transistor 216b may be added to the reference side of current mirror 204 by automatically closing switch 302 when 1000 Base-T mode is entered. Coupling diode-connected transistors 216a-b in parallel may reduce the transmitter launch voltage and/or transmitter power consumed during 1000 Base-T operation.

Transmitter 108 may be capable of switching to a lower output voltage without altering the signaling characteristics (e.g., pulse shape or modulation rate) of transmitter 108. Elements, such as active hybrid 210, may be configured to adjust to a lower transmit output voltage mode of transmitter 108. Enabling elements to adapt to the lower transmit output voltage mode may facilitate proper receive operation for transmitter 108. Moreover, an element (e.g., active hybrid 210) may reduce its cancellation voltage by a corresponding amount to facilitate proper cancellation of the transmitter voltage to be achieved at a receiver.

The transmit power of transmitter 108 may be successively reduced, based on a series of detections performed by detection element 310. For example, the transmit power may be set at 50% of the standard transmit power based on detection circuit 210 detecting 1000 base-T operation. The transmit power may be reduced from 50% of the standard transmit power to 20% of the standard transmit power if another operating condition, such as a backplane application, is detected. The percentages described in this example are provided for illustrative purposes only and are not intended to limit the scope of the present invention. The transmit power of transmitter 108 may be set at any percentage of the standard transmit power. Alternatively, the transmit power may be set to be greater than the standard transmit power.

In FIG. 3, current mirror 204 includes two diode-connected transistors 216a-b for illustrative purposes, though current mirror 204 may include any number of diode-connected transistors 216a-b.

Figure 4:
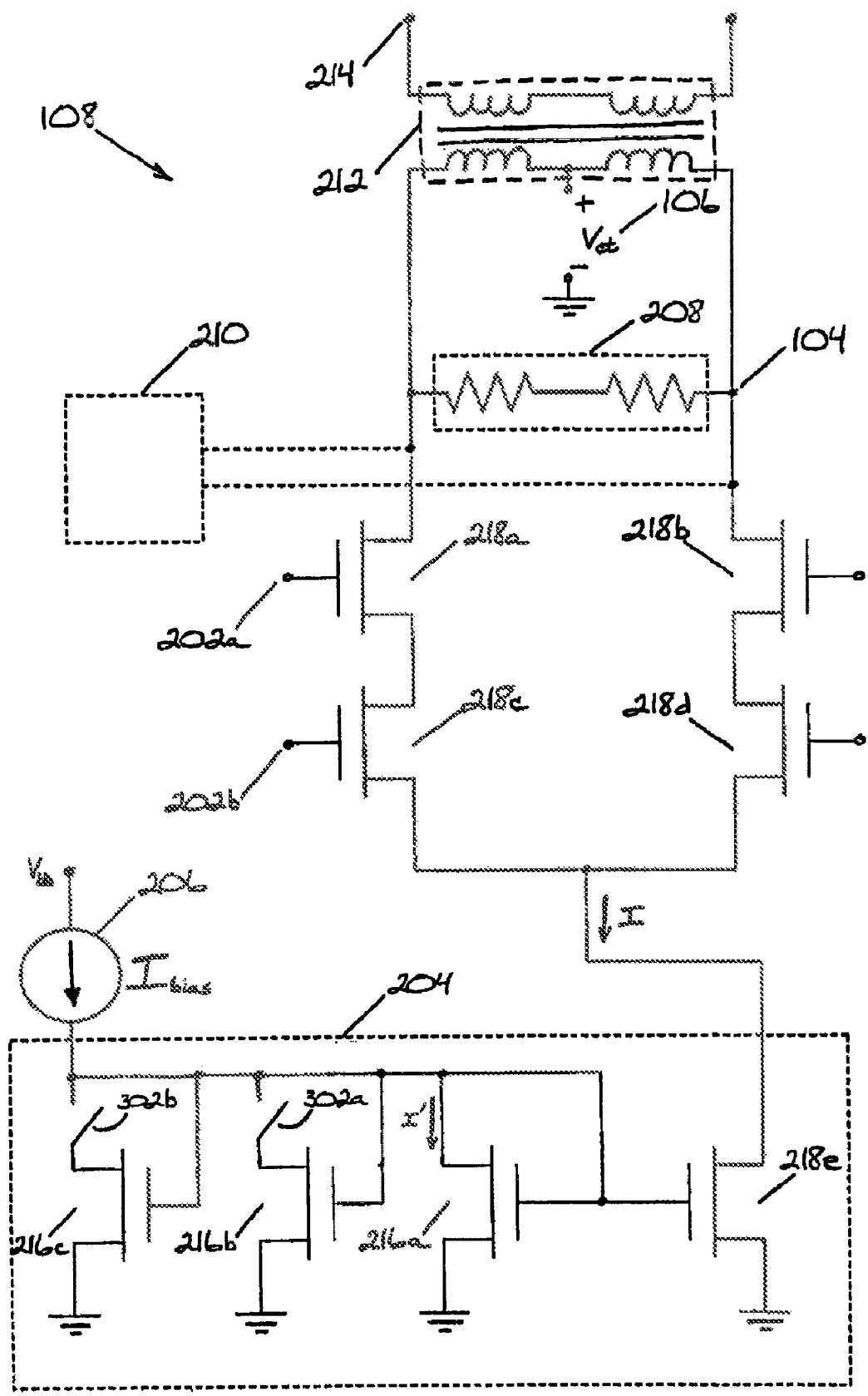
FIG. 4 shows the transmitter of FIG. 2 having diode-connected transistors that are capable of being connected in parallel according to another embodiment of the present invention.

FIG. 4 shows transmitter 108 having three diode-connected transistors 216a-c that are capable of being connected in parallel according to another embodiment of the present invention. In FIG. 4, switch 302a selectively couples the drain of transistor 216b to bias source 206, and switch 302b selectively couples the drain of transistor 216c to bias source 206. The drain of diode-connected transistor 216a is shown to be hard-wired to bias source 206, though the scope of the present invention is not limited in this respect. For example, a switch may be coupled between the drain of diode-connected transistor 216a and bias source 206 to enable diode-connected transistor 216 to be selectively coupled in parallel with one or more of transistors 216b-c. Any of diode-connected transistors 216a-c may be hard-wired or selectively coupled to bias source 206.

Referring to FIG. 4, switches 302a-b are controlled to set the current I that flows through transistor 218e. In a first example, switches 302a-b are open, as shown in FIG. 4. In this example, the bias current $I_{bias}$ flows through transistor 216a, and diode-connected transistors 216b-c are essentially open-circuits. Thus, $I=I_{bias}$.

In a second example, switch 302a is closed, and switch 302b is open. The bias current $I_{bias}$ is divided between diode-connected transistors 216a-b, such that a current of $I'=I_{bias}/2$ flows through each of diode-connected transistors 216a-b.

In a third example, switch 302a is open, and switch 302b is closed. Half of the bias current $I_{bias}$ flows through diode-connected transistor 216a, and the other half of $I_{bias}$ flows through diode-connected transistor 216c, assuming that the gates of diode-connected transistors 216a and 216c have substantially the same proportions. In this example, a current of $I'=I_{bias}/2$ flows through each of diode-connected transistors 216a and 216c.

In a fourth example, switches 302a-b are closed, thereby connecting respective drains of diode-connected transistors 216b-c to bias source 206. The bias current $I_{bias}$ is divided among diode-connected transistors 216a-c, such that a current of $I'=I_{bias}/3$ flows through each of diode-connected transistors 216*a-c*. The current I flowing through transistor 218*e* is mirrored from the reference side of current mirror 204. Thus, the current I flowing through transistor 218*e* may be represented as $I=I'=I_{bias}/3$.

Coupling diode-connected transistors in parallel as described above with respect to FIGS. 3 and 4 may substantially reduce the transmit power of transmitter 108. For example, replacing one diode-connected transistor with two diode-connected transistors coupled in parallel may reduce the transmit power of transmitter 108 by approximately 50%. In another example, replacing one diode-connected transistor with three diode-connected transistors coupled in parallel may reduce the power consumption by approximately 66.7%.

Figure 5:
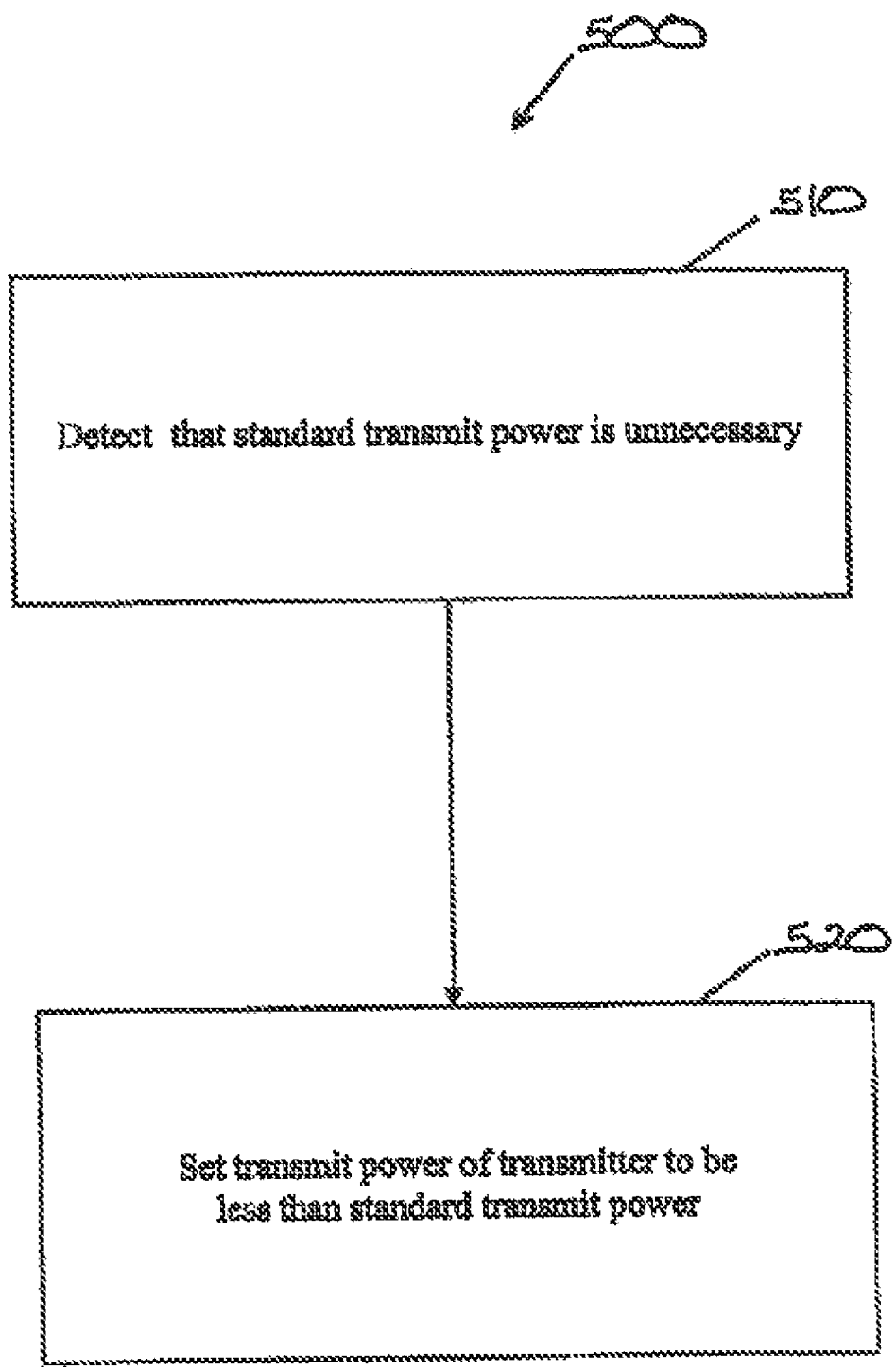
FIG. 5 illustrates a flowchart of a method of operating a transmitter in accordance with an embodiment of the present invention.

FIG. 5 illustrates a flowchart 500 of a method of operating a transmitter in accordance with an embodiment of the present invention. The invention, however, is not limited to the description provided by the flowchart 500. Rather, it will be apparent to persons skilled in the relevant art(s) from the teachings provided herein that other functional flows are within the scope and spirit of the present invention.

Flowchart 500 will be described with continued reference to example transmitter 108 described above in reference to FIGS. 2A-4, though the method is not limited to those embodiments.

Referring now to FIG. 5, detection element 310 detects that a standard transmit power is unnecessary at block 510. For example, detection element 310 may detect an operating condition associated with transmitter 108 and/or communication link 214. The standard transmit power is defined by a communication standard, such as 1000 base-T. Detection element may be implemented using hardware, software, or firmware, or any combination thereof. Detection element 310 may detect that the standard transmit power is unnecessary using any of a variety of means. Detection element 310 may use a communication link diagnostic algorithm, a programmable gain amplifier (PGA) setting, trial-and-error, or any other means.

A transmit power of transmitter 108 is set to be less than the standard transmit power at block 520. The transmit power may be set by any of a variety of means. For example, center tap voltage 106 of transmitter 108 may be set at a relatively low value by providing a relatively low launch voltage for transmitter 108. A relatively low center tap voltage corresponds with a relatively low transmitter power.

In another example, at least some elements 202-218 of transmitter 108 are manipulated to change the class of operation of transmitter 108. For instance, the class of operation of transmitter 108 may be changed from class A or class B operation to class AB operation.

In yet another example, transmitter 108 includes a current mirror 204 having a reference portion and a load portion. The reference portion includes a plurality of diode-connected transistors 216 that are connected in parallel. The reference portion is biased by a current that is divided among the diode-connected transistors 216, thereby causing the load portion of current mirror 204 to have a current that is less than the current that is provided to the reference portion of current mirror 204.

According to an embodiment, the transmit power of transmitter 108 is set at approximately 50% of the standard transmit power in response to detecting a 1000 base-T protocol. In this embodiment, the transmit power can be further reduced based another factor, such as the length of communication link 214. For example, the transmit power may be further reduced to 20% or some other value less than 50% for backplane applications.

Figure 7:
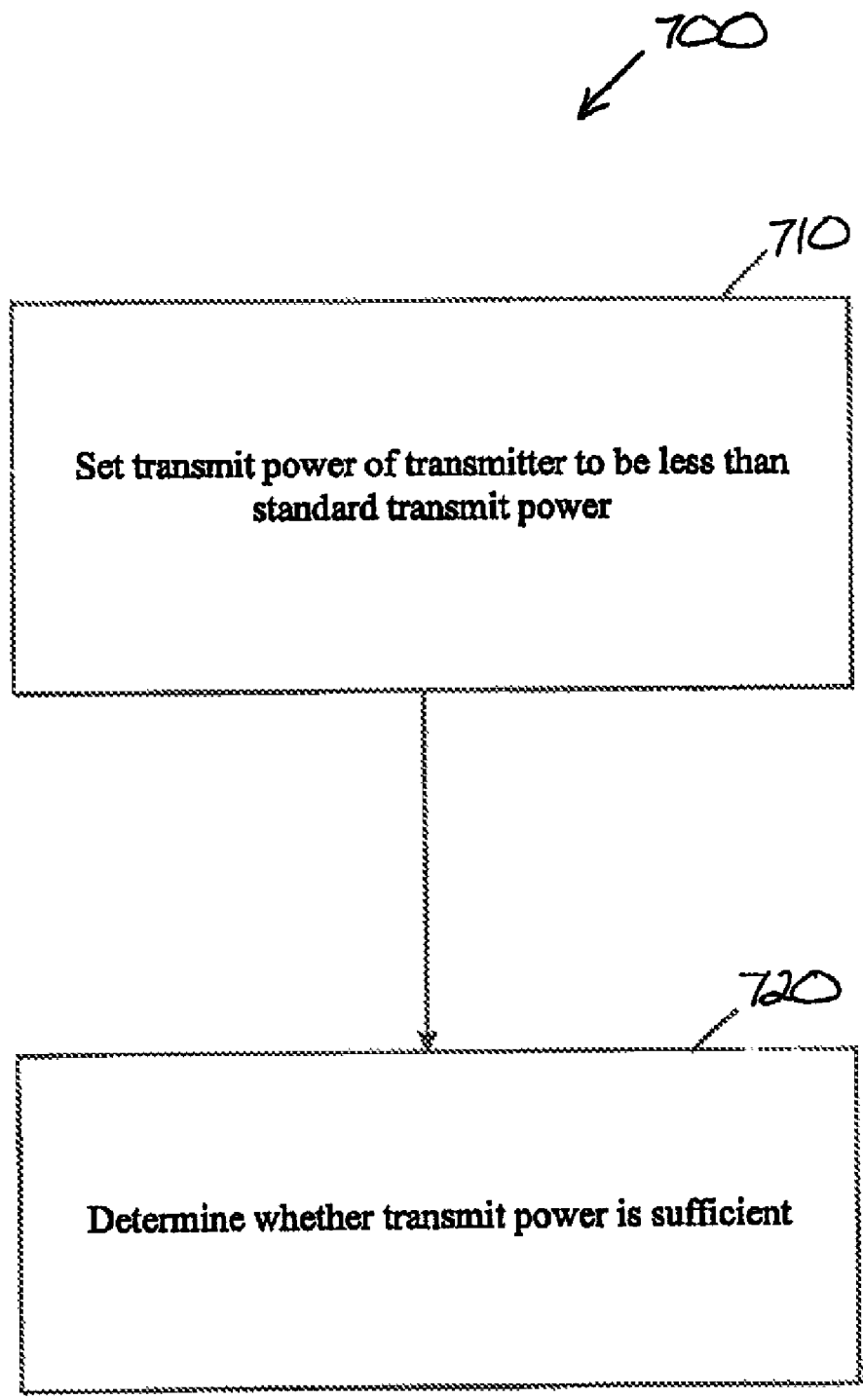
FIG. 7 illustrates a flowchart of a method of operating a transmitter in accordance with yet another embodiment of the present invention.

FIG. 7 illustrates a flowchart 700 of a method of operating a transmitter in accordance with another embodiment of the present invention. The invention, however, is not limited to the description provided by the flowchart 700. Rather, it will be apparent to persons skilled in the relevant art(s) from the teachings provided herein that other functional flows are within the scope and spirit of the present invention.

Flowchart 700 will be described with continued reference to example transmitter 108 described above in reference to FIGS. 2A-4, though the method is not limited to those embodiments.

Referring now to FIG. 7, a transmit power of transmitter 108 is set to be less than the standard transmit power at block 710. The transmit power may be set by any of a variety of means. For example, center tap voltage 106 of transmitter 108 may be set at a relatively low value by providing a relatively low launch voltage for transmitter 108. In another example, at least some elements 202-218 of transmitter 108 are manipulated to change the class of operation of transmitter 108. In yet another example, transmitter 108 includes a current mirror 204 having a reference portion and a load portion, wherein the load portion has a current that is less than a current that is provided to the reference portion. The transmit power of transmitter 108 may be set to be any proportion of the standard transmit power.

At block 720, detection element 310 determines whether the transmit power, which is set at block 710, is sufficient. The determination may be based on any of a variety of factors. For example, detection element 310 may determine whether the transmit power is sufficient based on an operating condition associated with transmitter 108 and/or communication link 214. In another example, detection element 310 may determine whether the transmit power is sufficient based on whether an element properly operates in response to receiving the transmit power. Detection element 310 may determine whether the transmit power is sufficient using any of a variety of means. Detection element 310 may use a communication link diagnostic algorithm, a programmable gain amplifier (PGA) setting, trial-and-error, or any other means.

Figure 6:
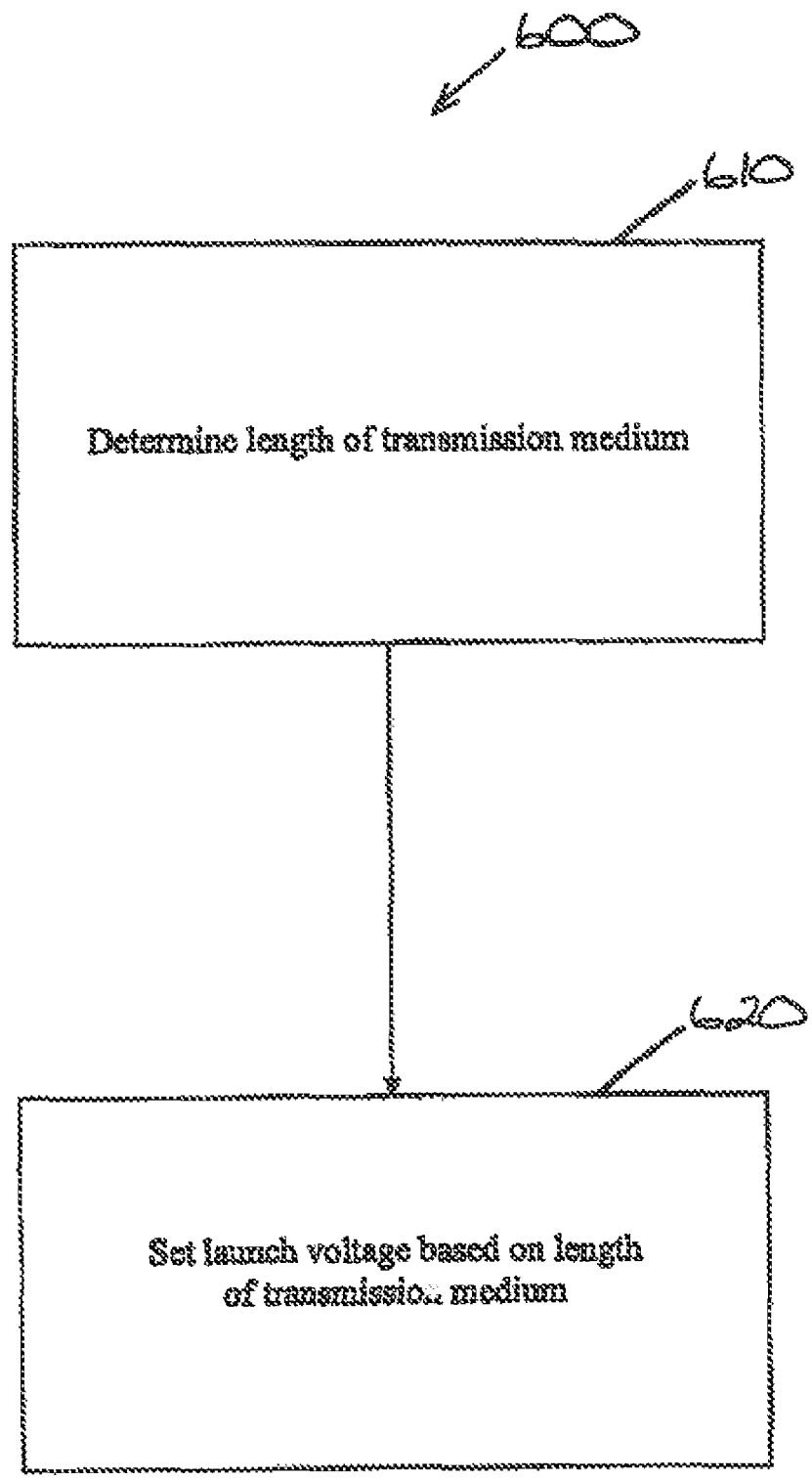
FIG. 6 illustrates a flowchart of a method of operating a transmitter in accordance with another embodiment of the present invention.

FIG. 6 illustrates a flowchart 600 of a method of operating a transmitter in accordance with yet another embodiment of the present invention. The invention, however, is not limited to the description provided by the flowchart 600. Rather, it will be apparent to persons skilled in the relevant art(s) from the teachings provided herein that other functional flows are within the scope and spirit of the present invention.

Flowchart 600 will be described with continued reference to example transmitter 108 described above in reference to FIGS. 2A-4, though the method is not limited to those embodiments.

Referring now to FIG. 6, detection element 310 determines a length of communication link 214 at block 610. The launch voltage of transmitter 108 is set at block 620, based on the length determined at block 610. The launch voltage may be set using any of a variety of means, such as any of those described above. For example, center tap voltage 106 may be reduced by reducing the current I in transmitter 108. In another example, center tap voltage 106 may be set independently of the current I.

In any of the embodiments described above, the transmit power of transmitter 108 may be set manually or automatically. The invention is not limited to the voltages or power levels mentioned herein. Other voltages may be used to reduce the transmitter power more or less. Alternatively, the transmitter power may be raised.

The power consumption reduction techniques described above may be used alone or in any combination. Other power consumption reduction techniques may be used in combination with the techniques described above. Transmitter 108 may communicate to other components in a network that transmitter 108 has a transmit power that is less than a standard transmit power.

III. OTHER EMBODIMENTS

According to an embodiment, current mirror 204 is included in a digital-to-analog converter (DAC). In another embodiment, transistors 218*a-e* are included in a current amplifier and/or a current buffer. For example, the transmit voltage of transmitter 108 may be adjusted by manipulating the amplification of the current amplifier and/or the current buffer.

IV. CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A transmitter configured to operate in accordance with a communication standard that defines a standard transmit power for a communications link, comprising:
   a detection circuit configured to determine if a power requirement of the communication link is less than the standard transmit power, the power requirement determined by a current operation condition of the communication link; and
   an amplifier configured to amplify an output signal for transmission over the communication link, wherein the amplifier is configured to reduce a power of the amplified output signal if the power requirement of the communication link is less than the standard transmit power.

2. The transmitter of claim 1, further comprising a transformer configured to provide a magnetic interface between the transmitter and the communication link, wherein the transformer comprises a center tap coupled to a center tap voltage that is configured to be reduced if the power requirement of the communication link is less than the standard transmit power.

3. The transmitter of claim 2, wherein the center tap voltage is reduced based on the voltage swing of the amplified output signal.

4. The transmitter of claim 1, wherein the amplifier comprises:
   a current mirror configured to provide an adjustable current to a load of the amplifier, wherein the adjustable current is configured to be reduced if the power requirement of the communication link is less than the standard transmit power.

5. The transmitter of claim 4, wherein the current mirror comprises:
   a plurality of diode-connected transistors.

6. The transmitter of claim 1, wherein the amplifier is further configured to change a class of operation of the amplifier if the power requirement of the communication link is less than the standard transmit power.

7. The transmitter of claim 1, wherein the current operation condition of the communication link is at least one of a length of the communication link, an attenuation characteristic of the communication link, and a signal-to-noise ratio (SNR) associated with the communication link.

8. The transmitter of claim 1, wherein the detection circuit is configured to determine if a length of the communication link is less than a threshold value.

9. The transmitter of claim 1, wherein the detection circuit is configured to determine if an attenuation characteristic of the communication link does not exceed a threshold value.

10. The transmitter of claim 1, wherein the detection circuit is configured to determine if a signal-to-noise ratio (SNR) associated with the communication link exceeds a threshold value.

11. A transmitter configured to operate in accordance with a communication standard that defines a standard transmit power for a communication link, comprising:
    a detection circuit configured to determine if a power requirement of the communication link is less than the standard transmit power, the power requirement determined by a signal-to-noise ratio (SNR) associated with the communication link; and
    an amplifier configured to amplify an output signal for transmission over the communication link, wherein the amplifier is configured to reduce a power of the amplified output signal if the power requirement of the communication link is less than the standard transmit power.

12. The transmitter of claim 11, further comprising a transformer configured to provide a magnetic interface between the transmitter and the communication link, wherein the transformer comprises a center tap coupled to a center tap voltage that is configured to be reduced if the power requirement of the communication link is less than the standard transmit power.

13. The transmitter of claim 12, wherein the center tap voltage is reduced based on the voltage swing of the amplified output signal.

14. The transmitter of claim 11, wherein the amplifier comprises:
    a current mirror configured to provide an adjustable current to a load of the amplifier, wherein the adjustable current is configured to be reduced if the power requirement of the communication link is less than the standard transmit power.

15. The transmitter of claim 11, wherein the amplifier is further configured to change a class of operation of the amplifier if the power requirement of the communication link is less than the standard transmit power.

16. A transmitter configured to operate in accordance with a communication standard that defines a standard transmit power for a communication link, comprising:
    a detection circuit configured to determine if a power requirement of the communication link is less than the standard transmit power, the power requirement determined by a length of the communication link; and
    an amplifier configured to amplify an output signal for transmission over the communication link, wherein the amplifier is configured to reduce a power of the amplified output signal if the power requirement of the communication link is less than the standard transmit power.

17. The transmitter of claim 16, further comprising a transformer configured to provide a magnetic interface between the transmitter and the communication link, wherein the transformer comprises a center tap coupled to a center tap voltage that is configured to be reduced if the power requirement of the communication link is less than the standard transmit power.

18. The transmitter of claim 17, wherein the center tap voltage is reduced based on the voltage swing of the amplified output signal.

19. The transmitter of claim 16, wherein the amplifier comprises:
   a current mirror configured to provide an adjustable current to a load of the amplifier, wherein the adjustable current is configured to be reduced if the power requirement of the communication link is less than the standard transmit power.

20. The transmitter of claim 16, wherein the amplifier is further configured to change a class of operation of the amplifier if the power requirement of the communication link is less than the standard transmit power.

* * * * *

UNITED STATES PATENT AND TRADEMARK OFFICE
CERTIFICATE OF CORRECTION

| | |
|---|---|
| PATENT NO. | : 8,150,341 B2 |
| APPLICATION NO. | : 13/099031 |
| DATED | : April 3, 2012 |
| INVENTOR(S) | : Kevin T. Chan |

It is certified that error appears in the above-identified patent and that said Letters Patent is hereby corrected as shown below:

Title page, Item (*), please add --This patent is subject to a terminal disclaimer--.

Signed and Sealed this
Twenty-ninth Day of May, 2012

David J. Kappos
*Director of the United States Patent and Trademark Office*